(12) United States Patent
Campbell et al.

(10) Patent No.: US 10,767,892 B2
(45) Date of Patent: Sep. 8, 2020

(54) INSULATED FLEXIBLE DUCT USING COMPRESSIBLE CORE SPACER AND METHOD OF USE

(71) Applicant: FLEXIBLE TECHNOLOGIES, INC., Abbeville, SC (US)

(72) Inventors: Donald B. Campbell, Gallatin, TN (US); Ronald L. Carlay, II, Laurens, SC (US)

(73) Assignee: FLEXIBLE TECHNOLOGIES, INC., Abbeville, SC (US)

( * ) Notice: Subject to any disclaimer, the term of this patent is extended or adjusted under 35 U.S.C. 154(b) by 78 days.

(21) Appl. No.: 16/201,066

(22) Filed: Nov. 27, 2018

(65) Prior Publication Data

US 2020/0166238 A1     May 28, 2020

(51) Int. Cl.
*F24F 13/02*      (2006.01)
*F16L 11/08*     (2006.01)

(52) U.S. Cl.
CPC ......... *F24F 13/0218* (2013.01); *F16L 11/081* (2013.01); *F24F 13/0263* (2013.01)

(58) Field of Classification Search
CPC ... F24F 13/0218; F24F 13/0263; F16L 11/081
USPC ........................................................ 138/132
See application file for complete search history.

(56) References Cited

U.S. PATENT DOCUMENTS

| | | | |
|---|---|---|---|
| 3,326,244 A * | 6/1967 | Prevost | F16L 59/13 138/114 |
| 3,565,118 A | 2/1971 | Stearns | |
| 3,565,120 A | 2/1971 | Bennett | |
| 3,791,416 A * | 2/1974 | Ziemek | F16L 59/065 138/112 |
| 3,826,286 A * | 7/1974 | Beck | F16L 59/08 138/114 |
| 4,101,700 A * | 7/1978 | Ray, Jr. | C08K 3/28 428/131 |
| 4,557,297 A * | 12/1985 | Montana | F16L 59/145 138/137 |
| 5,526,849 A | 6/1996 | Gray | |
| 5,947,158 A | 9/1999 | Gross et al. | |
| 7,140,397 B2 * | 11/2006 | Shaffer | B32B 5/26 138/149 |

(Continued)

*Primary Examiner* — Craig M Schneider
*Assistant Examiner* — David R Deal
(74) *Attorney, Agent, or Firm* — Clark & Brody LP

(57) ABSTRACT

A flexible duct for handling conditioned air comprises an inner core, a vapor barrier, and a compressible core spacer positioned between the inner core and vapor barrier. The compressible core spacer is made of a film material with a helical support integrated therewith. The compressible core spacer is made of a length longer that the inner core and other duct components so that when the compressible core spacer is compressed when assembling the inner core and vapor barrier, the film material between adjacent sections of the helical support folds to create a spacer-liker construction that creates air gaps between an outer surface of the inner core and an inner surface of the compressible core spacer and outer surface of the inner core and vapor barrier. With a pair of low-e surfaces associated with the compressible core spacer or the compressible core spacer and inner core, reflective insulation systems are created to improve the insulating value of the insulated flexible duct.

11 Claims, 10 Drawing Sheets

(56) References Cited

U.S. PATENT DOCUMENTS

| | | | |
|---|---|---|---|
| 7,220,470 B2* | 5/2007 | Toas | B32B 17/04 |
| | | | 428/35.7 |
| 9,297,550 B2 | 3/2016 | Fanelli | |
| 9,322,164 B2* | 4/2016 | Ray | B32B 3/28 |
| 9,366,366 B2 | 6/2016 | Carlay, II et al. | |
| 9,523,512 B2 | 12/2016 | Carlay, II | |
| 10,054,252 B2* | 8/2018 | Homann | F16L 9/121 |
| 2010/0186846 A1* | 7/2010 | Carlay, II | F16L 11/045 |
| | | | 138/137 |
| 2010/0282356 A1* | 11/2010 | Sawyer, Sr. | F16L 11/14 |
| | | | 138/149 |
| 2013/0220472 A1 | 8/2013 | Kose | |
| 2014/0261701 A1* | 9/2014 | Deutsch | F24F 13/0218 |
| | | | 137/1 |
| 2015/0090360 A1 | 4/2015 | Carlay, II et al. | |
| 2017/0038091 A1 | 2/2017 | Campbell et al. | |
| 2017/0146157 A1 | 5/2017 | Carlay, II et al. | |
| 2017/0227248 A1 | 8/2017 | Kose | |

* cited by examiner

INSULATED FLEXIBLE DUCT USING COMPRESSIBLE CORE SPACER AND METHOD OF USE

FIELD OF THE INVENTION

An insulated flexible duct for handling conditioned air such as that found in an HVAC system includes an inner core, outer liner or vapor barrier, and a compressible core spacer positioned between the inner core and the vapor barrier. The compressible core spacer acts as a spacer between the vapor barrier and inner core and can creates one or more reflective insulation systems for the insulated flexible duct, thus increasing its R value.

BACKGROUND ART

The construction of factory-made flexible HVAC ducts is well known in the industry. These types of ducts usually comprise a helical-supported duct liner (sometimes referred to as the core or inner core) covered by a layer of fiberglass insulation, which is, in turn, covered by a scrim-reinforced PET vapor barrier or a PE-film vapor barrier. Scrim is a woven material that adds strength to a laminate construction when made a part thereof. U.S. Pat. Nos. 6,158,477 and 5,785,091 show typical constructions of factory made ducts. U.S. Pat. No. 5,785,091 teaches that the duct liner and vapor barrier can be manufactured from polymer films, particularly polyester. U.S. Pat. No. 5,526,849 discloses a plastic helical member in combination with a metal helical member and U.S. Pat. No. 4,990,143 discloses a polyester helix. United States Patent Publication No. 2007/0131299 discloses a polyester scrim used in a vapor barrier.

In the prior art, factory-made flexible HVAC ducts are typically constructed of three main components; a duct liner for conveying air, a layer of insulation for preventing energy loss through the duct wall, and a vapor barrier for holding the fiberglass around the liner while protecting the fiberglass from moisture. The duct liner is commonly constructed of a steel wire sandwiched between layers of polyester (PET) film. Other plastics and coated fabrics are also used to construct the wall of the duct liner. United States Published Patent Application No. 2010/0186846 to Carlay et al. is another example of flexible duct and it is incorporated in its entirety herein.

Another example of a prior art duct is that shown in United States Published Patent Application No. 2015-0090360 to Carlay III. This duct has an inflatable jacket to create an air space around the duct core or liner to reduce the amount of bulk insulation in the duct without reducing the overall insulating value of the duct. While this duct is advantageous in terms of its insulating value, it has some drawbacks in terms of manufacture to create the inflatable jacket.

In the HVAC industry, ductwork is often times specified to have a certain thermal resistance or R value for a particular application. For example, if the ductwork is to run in an unconditioned space, the R value must be at least 6.0. Current North American flexible duct fiberglass R-values are R4.2, R6.0 and R8.0 and each may be purchased pre-certified from fiberglass manufacturers. Obviously, the cost of the ductwork increases from one that has an R6.0 value to an R8.0 value due to the need to provide additional bulk insulation, which is generally fiberglass insulation.

In the HVAC industry, the fundamentals of heat transfer and the like are explained in the ASHRAE Handbook of Fundamentals (the Handbook), which is currently in a 2017 edition. Included in this Handbook is the recognition of reflective insulation systems, which combines a reflective insulation and an enclosed air space bounded within a particular assembly, see page 26.12 of the Handbook. The 2013 edition of the Handbook also recognize the effect of thermal resistance as it relates to a particular size air space and the direction of heat flow, e.g. up, down, oblique up or down, etc., see pages 26.13 and 26.14. What these pages generally show is that an increase in thermal resistance occurs when the air space or air gap increases and that the thermal resistance is the least when the heat flow is in the up direction.

An example of the use of a reflective insulation system in these ducts to improve their insulating performance is shown in Pre-Grant Publication No. 2017/0038091 to Campbell et al., which is incorporated by reference in its entirety herein. This duct uses a free floating liner that forms a variable spaced air gap. The duct can also employ low emissivity (low-E) materials on one or more of the duct components to create a reflective insulation system in the variable spaced air gap. These low-E materials are well known in the duct industry and are commonly made by using a metallized coating on the surface of a given duct component. Aluminum is one example of these type materials that when coated on a surface forms a low-E surface that stops radiant heat transfer.

However, there is always a need to provide improved duct designs in the HVAC industry and other areas where air or fluid handling is necessary. The present invention responds to this need by providing an improved insulated flexible duct.

SUMMARY OF THE INVENTION

The invention provides, in one embodiment, an improved insulated flexible duct through the combination of one or more reflective insulation systems, an inner core, and a compressible spacer, and an inner core of the insulated duct. The insulated duct includes at least one low-e surface and an air space (hereinafter air gap) between the low-e surface and an adjacent surface of one of the components of the flexible duct. The compressible core spacer is compressed when the duct is assembled so as to create the air gap of the reflective insulation system. The reflective insulation system adds additional R value to the duct.

Another embodiment of the invention uses the inventive flexible duct with bulk insulation to provide even greater insulating performance. With the reflective insulation system described above and the use of bulk insulation, the overall R value of the flexible duct can be significantly increased. For example, using a bulk insulation layer having an R value of 4.2 and the use of two reflective insulation systems can produce an insulated duct having an R value of about 8.

More particularly, the reflective insulating system-containing flexible duct comprises an inner core having a defined length, a vapor barrier surrounding the cylindrical inner core, and a compressible core spacer positioned between the inner core and vapor barrier. The compressible core spacer comprises a polymer film material and helical support integrated with the polymer film material. A length of the compressible core spacer at rest is made longer than the defined length of the inner core. Since the compressible core spacer is compressible in length by its structure of polymer film and helical support, when the compressible core spacer is positioned between the inner core and vapor barrier, longitudinal compression of the compressible core spacer folds the polymer film material between adjacent sections of the helical support. The folded film material acts as a spacer to create a number of contact surfaces for engagement with the inner core and a first air gap between an outer surface of the inner core and an inner surface of the compressible core spacer. With the folding of the polymer film, a second air gap is also created between the outer surface of the compressible core spacer and an inner surface of the vapor barrier.

The duct includes at least one reflective insulation system comprising a low-E surface on one or more of the outer surface of the inner core, the inner surface of the vapor barrier, the inner surface of the compressible spacer, the outer surface of the compressible spacer, and an inner surface of the vapor barrier. The low-E surface in combination with one of the first or second air gaps forms the at least one reflective insulation system and increases an R value of the flexible duct.

The flexible duct can include more than one low-E surface so that two or more reflective insulation systems are provided. As an example, the outer surface of the compressible core spacer could include a low-E surface to create a reflective insulation system between the outside of the compressible core spacer and the vapor barrier in addition to a reflective insulation system created in the air gap between the inner core and an inner surface of the compressible core spacer.

In another mode, the compressible core spacer could have low-E surfaces on its inner and outer surfaces to create the two reflective insulation systems with the inner core and vapor barrier, respectively.

A given reflective insulation system could also include a low-E surface on both surfaces of the system. As example would be the outer surface of the inner core and the inner surface of the compressible core spacer could each have a low-E surface.

In the second embodiment of the invention, at least one bulk insulation layer is provided as part of the duct assembly. In one mode, the at least one bulk insulation layer can be positioned between at least one of the inner core and the compressible core spacer and the compressible core spacer and the vapor barrier. An alternative mode when using the bulk insulation layer is that one bulk insulation layer is positioned between the compressible core spacer and the inner core and another bulk insulation layer is positioned between the compressible core and the vapor barrier.

For the embodiment using the bulk insulation, one or more than one reflective insulation systems can be employed using a low-E surface on one or more the surfaces of inner core, compressible core spacer, and vapor barrier.

When using bulk insulation, the bulk insulation can have any value, including one of an R4.2 value, an R6 value, and an R8 value.

The invention also includes a method of using the inventive insulated flexible duct to supply conditioned air to a desired space or spaces in a given structure.

BRIEF DESCRIPTION OF THE DRAWINGS

FIG. 2b is a vertical mid-sectional schematic representation of the assembled insulated flexible duct depicted in FIG. 2a.

FIG. 3b is a schematic representation of an effective wall thickness of the compressible core spacer of FIG. 3a.

FIG. 5 is end view schematic representation of an assembled flexible duct of the invention using bulk insulation in a different position as compared to the flexible duct of FIG. 2a.

DETAILED DESCRIPTION OF THE INVENTION

Figure 1A:
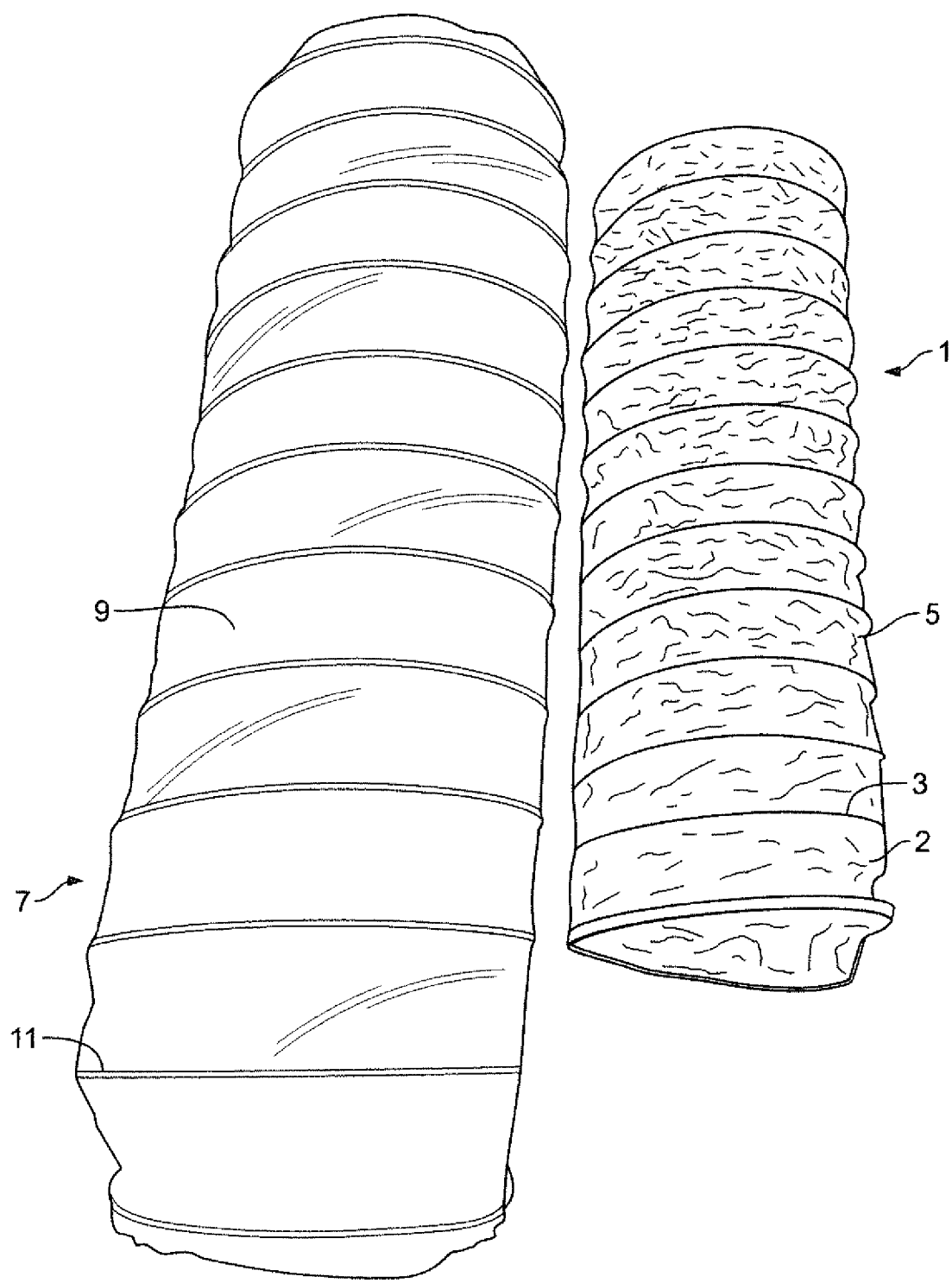
FIG. 1a is a top view of the inner core and compressible core spacer components of one embodiment of the insulated flexible duct of the invention.

The invention in one embodiment provides an improved insulated flexible duct through the combination of a reflective insulation system, bulk insulation, an inner core, a vapor barrier, and a compressible core spacer arranged between the inner core and bulk insulation. The insulated duct includes a low-e surface and at least one air space (hereinafter air gap) created by the compressible core spacer and the components adjacent thereto. The reflective insulation system adds additional R value to the duct. This permits using bulk insulation of a lesser R value than normally used while still maintaining the desired overall R value of the inventive insulated flexible duct.

FIGS. 1a-1g illustrate a first embodiment of the insulated flexible duct of the invention and this duct is designated by reference numeral 10. These figures show the duct in terms of individual components and the duct in an assembled form.

FIGS. 1a-1d show two components of the flexible duct. FIG. 1a shows an inner core 1 that is generally cylindrical in shape and is designed to handle conditioned air when the flexible duct 10 is used as part of a conditioned air system, e.g., ductwork in a residential or commercial structure. The flexible duct 10 when assembled typically has a defined length and any number of lengths can be used together to make a designed run of duct in any given system for handling conditioned air.

The inner core 1 can be made of any materials as would be known in the art when making an inner core for handling of conditioned air. Generally, the inner core is made using a polymer film 2 and includes a helical support 3. The helical support 3 can be any kind used in flexible ducts, including ones made of metal or non-metallic materials like a polymer. An example of an inner core construction is a pair of polyester (polyethylene terephthalate or PET) films with the helical support sandwiched between but other types of polymer films or polymer-containing films, e.g., polymer coated fabrics can be used. In FIG. 1a, the inner core is also shown with a metallized outer surface 5, which functions as a low-e surface for the reflective insulation system of the duct 10.

The use of low-e materials is well known in the art and they include metal foils or films coated with a reflective material. Some of these materials are made as a laminate construction with a polymer film such as polyester, and thin aluminum coating on a surface of the polyester. Some films can be overcoated with a protective coating on the metallic side to protect the reflective surface, e.g., from oxidation and/or loss of the coating itself. The metal film side can be used to insulate against radiant heating effects.

An example of a low-e film is one made with a polymer film and a reflective coating thereon. A protective coating can cover the reflective, e.g., metallic, coatings if so desired. The low-e film is secured to the polymer film forming the duct wall using an adhesive. A helical support can be positioned between the film forming the duct wall and the low-e film. The placement of a low-e film on the outside of the inner core 1 and facing the gap created by the compressible core spacer forms the reflective insulation system that provides additional insulating value to the overall duct 10. Examples of the construction of duct with low-e surfaces are found in the Campbell publication noted above and any type of low-e surface, which has a reflective surface, can be associated with one or more components of the inventive insulated flexible duct.

FIG. 1a shows a second component of the duct as a compressible core spacer 7. The construction of the compressible core spacer 7 is similar to that of the inner core in that a polymer film 9 is used in combination with a helical support 11. In the embodiment of FIGS. 1a-f, the compressible core spacer 7 does not include a low e-surface on it but it can have one as detailed below.

The compressible core spacer 7 is made longer in length than the inner core 1 to create one or more reflective insulation systems as part of the insulated flexible duct as explained below. As with the inner core 1, the film material of the compressible core spacer 7 can be any film material commonly used in flexible ducts for conditioned air handling.

Figure 1B:
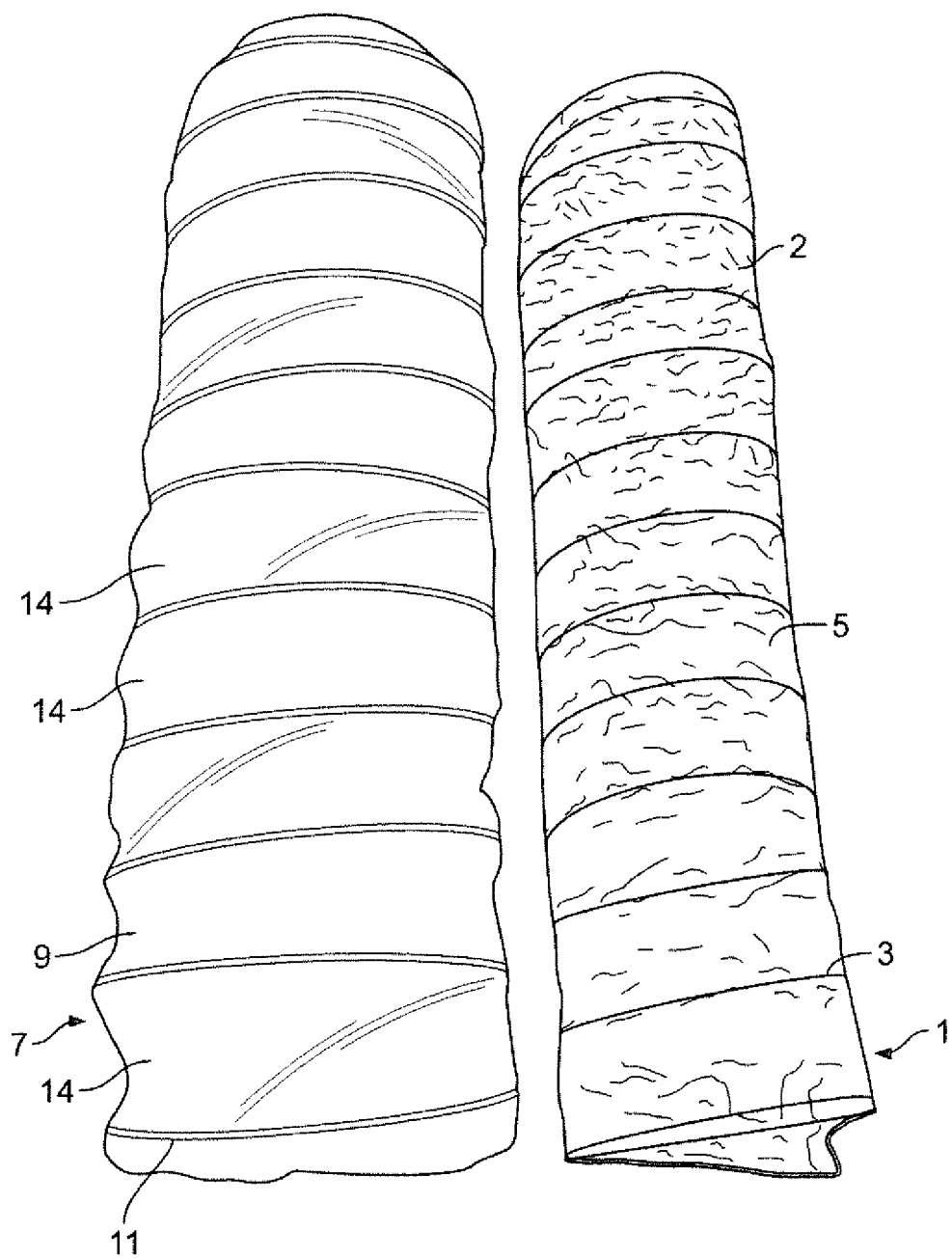
FIG. 1b is a top view of the components of FIG. 1 with the compressible core spacer in a compressed state.
Figure 1C:
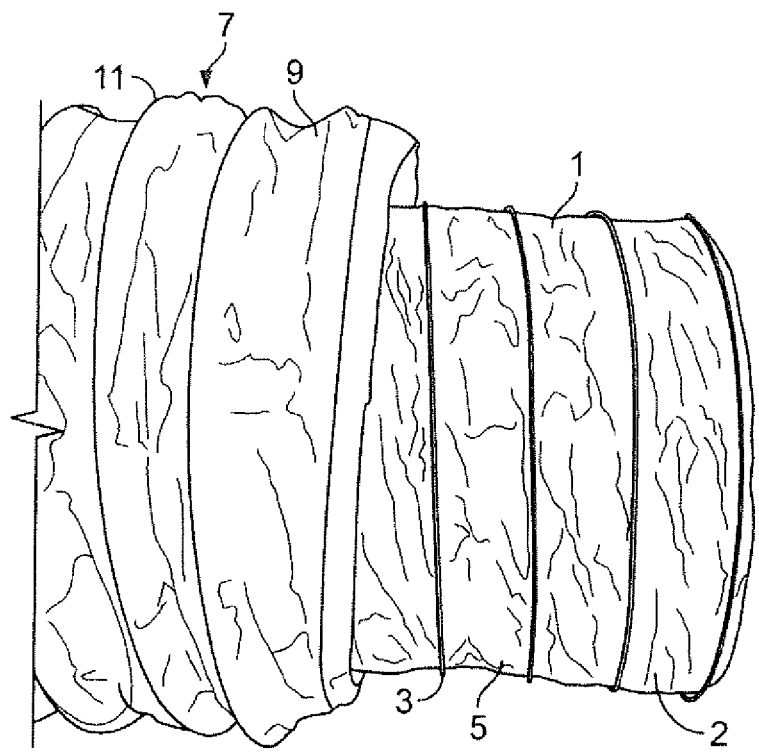
FIG. 1c is side view of an end of the components of FIG. 1, with the inner core positioned inside the compressible spacer.
Figure 1D:
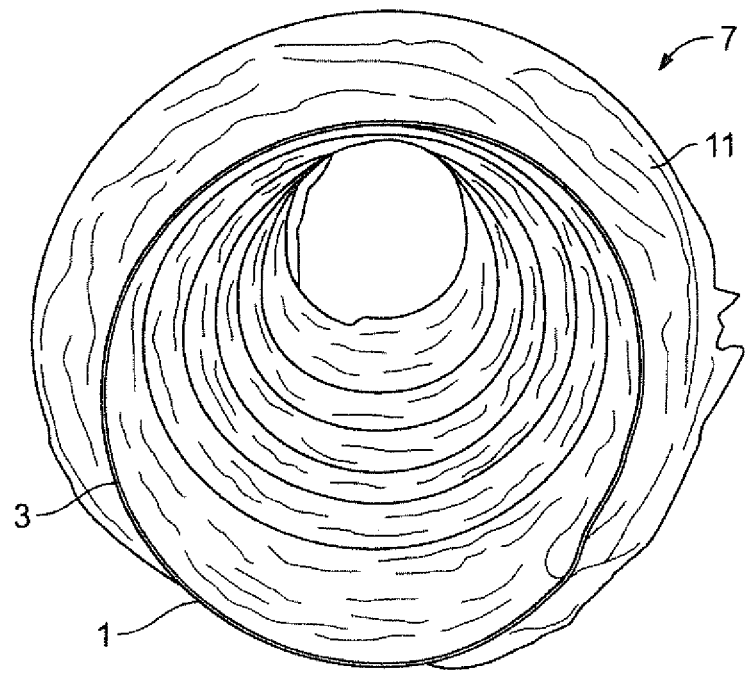
FIG. 1d is an end view of the components of FIG. 1c.
Figure 1E:
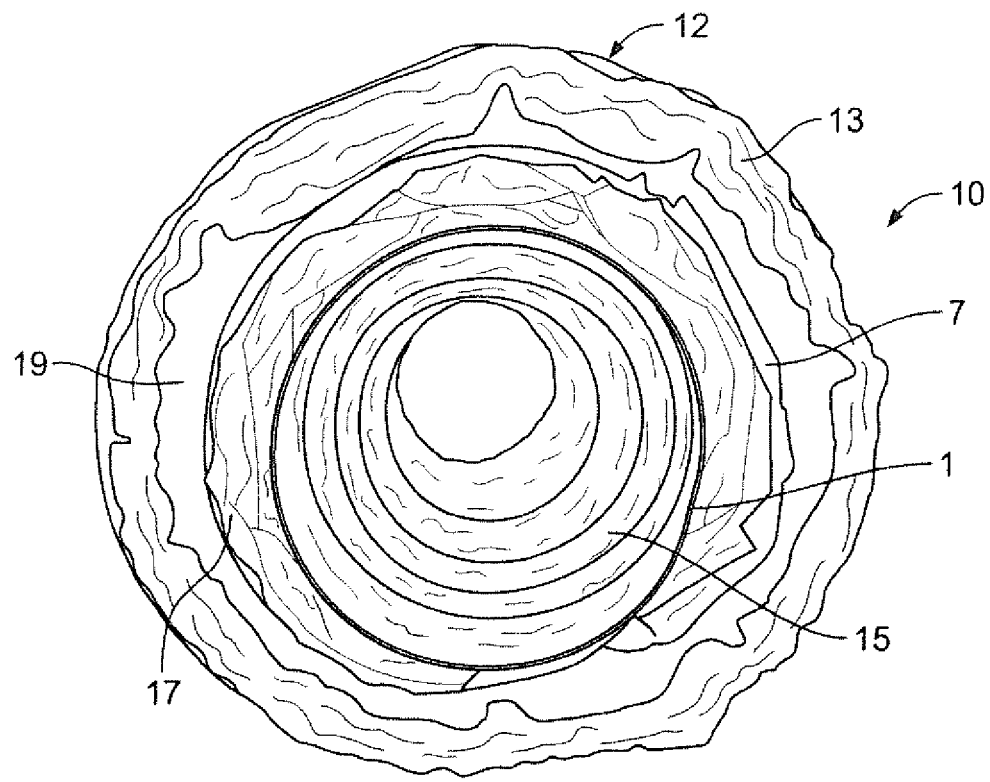
FIG. 1e shows an end view of an assembled flexible duct of the invention, showing the inner core, compressible spacer, bulk insulation, and vapor barrier.
Figure 1F:
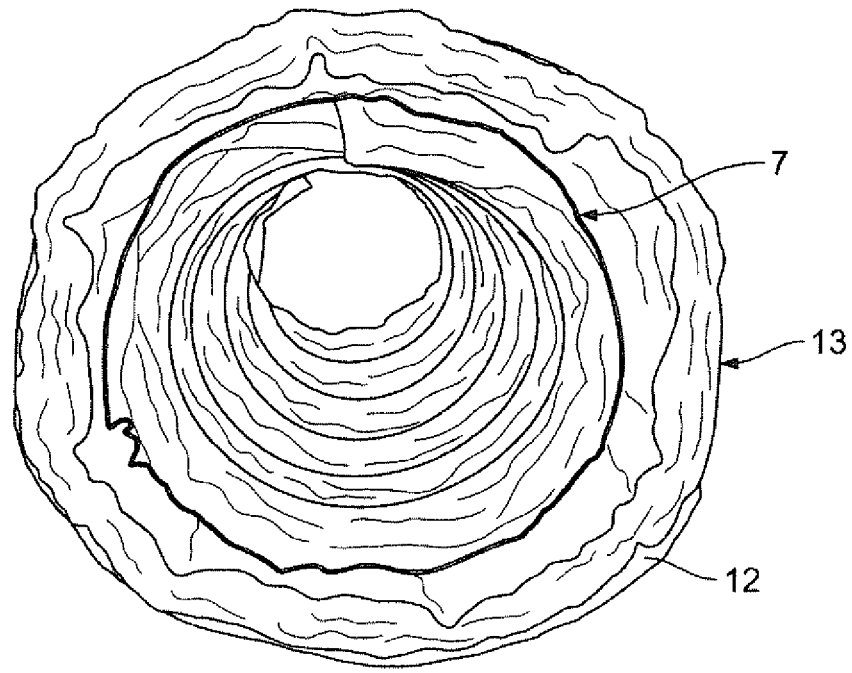
FIG. 1f shows the end view of the duct of FIG. 1e without the inner core.

Referring to FIGS. 1e and 1f, two other components of the flexible duct 10 are disclosed. A third component of insulated flexible duct of the FIG. 1a-1g embodiment is an outer liner or vapor barrier 12. The vapor barrier 12 is a conventional layer used in ductwork and is commonly constructed of either a tubular extruded polyethylene film or a fiberglass rip-stop, i.e., a scrim, sandwiched between layers of a polyester film. In the case of polyester films, the outer layer of film can be a metallic-coated polyester film while the inner film is clear uncoated polyester film. The preferred polyester is polyethylene terephthalate, both as the inner and outer layers of the vapor barrier 12. A polyester scrim may be substituted for the fiberglass scrim. In fact, any type of known vapor barrier can be used as part of the flexible duct 10 of the invention.

A fourth component of the insulated flexible duct 10 in the FIGS. 1a-1g embodiment is bulk insulation 13. The bulk insulation 13 can be any type used in flexible ducts like the inventive 10 and is typically fiberglass batt insulation of a desired R value and wall thickness.

FIG. 1e shows the assembled duct 10 with the inner core 1 surrounded by the compressible core spacer 7, the compressible core spacer 7 surrounded by the bulk insulation 13, and the bulk insulation 13 surrounded by the vapor barrier 12. The inner core 1 forms a channel 15, which handles the conditioned air of the system using the flexible duct 10.

Still referring again to FIG. 1e, this figure shows various air gaps formed when the flexible duct 10 is assembled using the inner core 1, the compressible core spacer 7, the bulk insulation 13, and vapor barrier 12 are assembled together. Besides the inner channel 15, two other spaces are created when the components of the insulated flexible duct 10 of the first embodiment of the invention are assembled together. A first air gap 17 is created between an outer surface of the inner core 1 and an inner surface of the compressible core spacer 7. A second air gap 19 is created between the outer surface of the compressible core spacer 7 and an inner surface of the bulk insulation 13. The air gaps are created as a result of a longitudinal compression of the compressible core spacer 7 as explained below.

Referring back to FIGS. 1a-1c, the compressible core spacer 7 is shown in combination with the inner core 1. In FIG. 1a, side by side views of the compressible core spacer 7 and inner core 1 are shown with the compressible core spacer 7 in its un-compressed state. The inner core 1 has a defined length as shown in FIG. 1a and is not used in a compressed state when the duct components are assembled together. The inner core 1 as shown in FIG. 1 remains essentially the same when assembled as part of a conditioned air handling system.

As is evident from FIG. 1a, the length of the compressible core spacer 7 at rest is longer than the length of the inner core 1. With this difference in length, when the compressible core spacer 7 is assembled with the inner core 1 to form the assembled flexible duct 10, the length of the compressible core spacer 7 is reduced and this reduction in length is shown in FIG. 1b. What is noticeable when comparing FIGS. 1a and 1b is that the film 9 between adjacent helical supports 11 extends inwardly with respect to the helical support 11 and this section of film is shown by reference numeral 14 in FIG. 1b. The length reduction of the compressible core spacer 7 results in a bunching or folding up of the flexible film 9 between the adjacent sections of the helical support 11. This bunching or folding of the film material enlarges an overall end view width of the compressible core spacer 7. In different terms, the compressible core spacer 7 when longitudinally compressed has an outer diameter generally defined by the helical support 11 and a reduced inner diameter formed by the flexible film sections 14, which extend inwardly of the helical support 11 when the compressible core spacer 7 is compressed in length. This bunching or folding up of the flexible film 9 creates a smaller overall inner diameter for the compressed core spacer 7 such that surfaces created by the folding contact an outer surface of the inner core 1 and create the air gap 17 for improved insulating purposes.

Figure 1G:
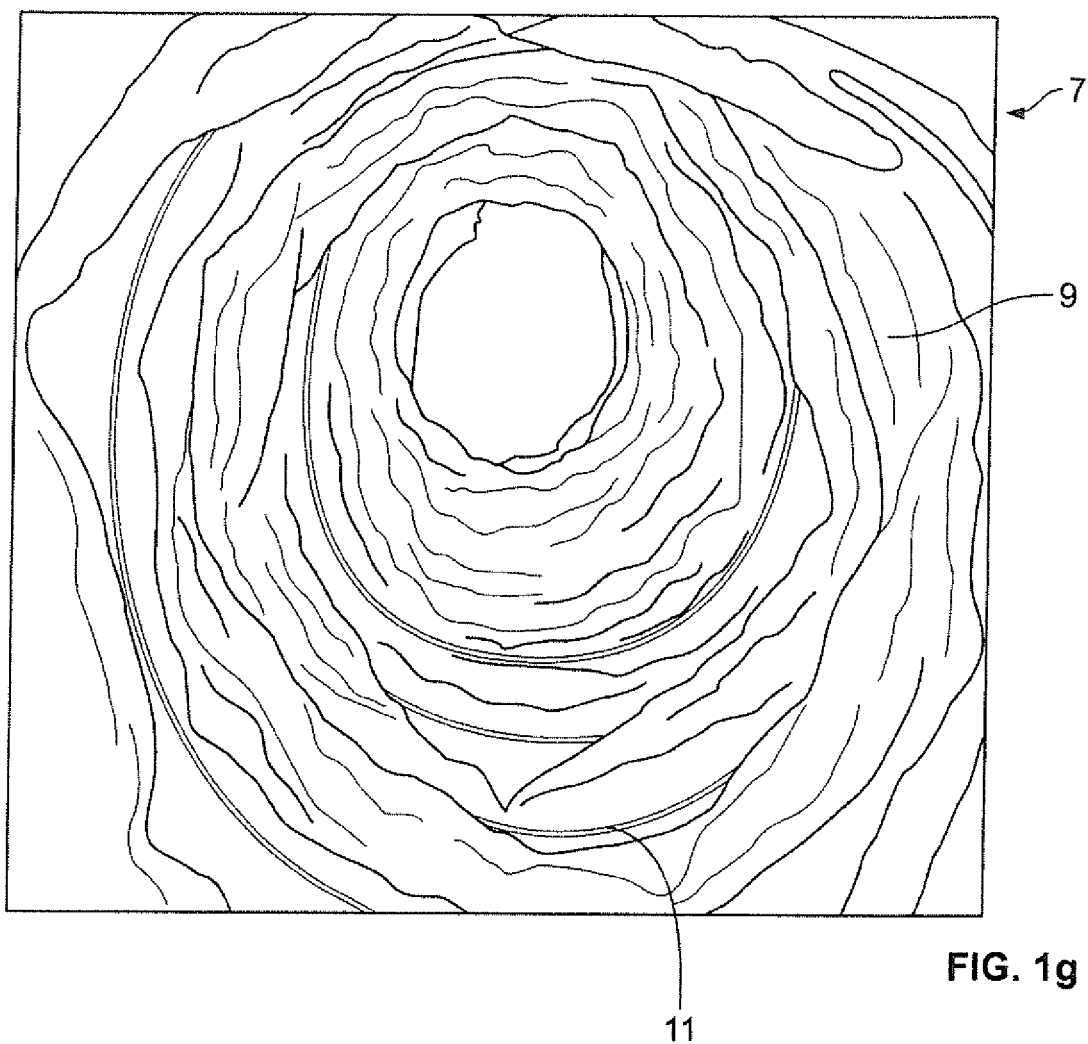
FIG. 1g shows an enlarged view of the inside of the compressible core spacer shown in FIG. 1e.

FIG. 1g shows just an enlarged view of the inside of the compressible core spacer 7 in a compressed state. It can be seen that an inner surface is more folded and creased, creating multiple contact surfaces that can engage portions of the outer surface of the inner core 1, the various folded parts of the film 9 acting as a spacer for the inner core 1.

Figure 2A:
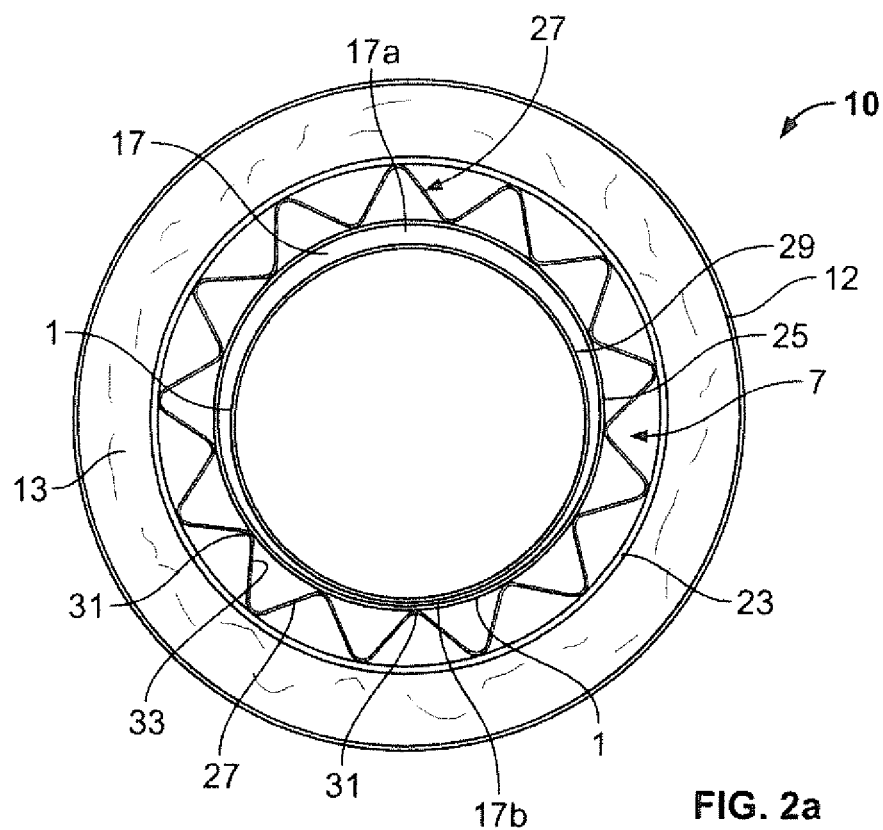
FIG. 2a is an end view schematic representation of an assembled insulated flexible duct of the invention using bulk insulation with the inner core, the compressible spacer, and the vapor barrier.
Figure 2B:
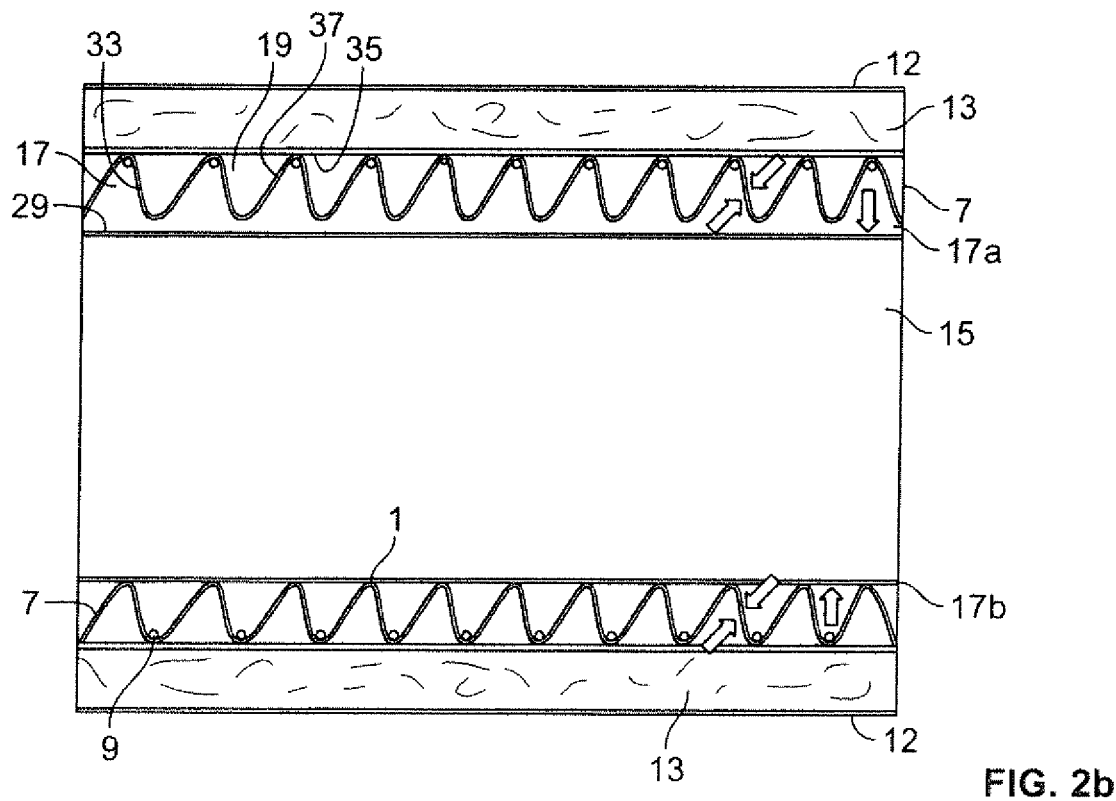

The interaction between the compressible core spacer 7 and its adjacent components of the inner core 1 and the bulk insulation 13 is shown in more detail in the schematic representations of FIGS. 2a and 2b, which show of an end view and sectional view of the assembly duct 10 respectively.

In FIG. 2a, an overall outer diameter of the compressible core spacer 7 is represented by the line 23 and the overall inner diameter is represented by the line 25. The folds created in the film 9 of the compressible core spacer 7 are represented by reference numeral 27. The use of lines 23 and 25 define an effective wall thickness created by the compressed core spacer 7 as seen from an end view perspective. The real wall thickness of the compressible core spacer 7 does not change as the thickness of the film 9 with or without the helical support 11 is constant along the length of the compressible core spacer 7. However, the longitudinal compression of the compressible core spacer 7 and change of shape of the film 9 and inward folding thereof between adjacent portions of the helical support 11 does enlarge an overall wall thickness when considering an end view of the compressible core spacer 7.

FIG. 2a also shows the gap 17 that is created by the compressible core spacer 7 and an outer surface 29 of the inner core 1. What FIG. 2a also shows is that the gap 17 between the outer surface 29 of the inner core 1 and the compressible core spacer 7 varies between a large gap, designated as 17a at the top of the flexible duct 10 and a minimal gap 17b, where the inner core 1 rests on the various folds 27 of the compressible core spacer 7. The folds 27 create contact surfaces 31 such that the folds 27 of the compressible core spacer 7 when in its compressed state function as a spacer between the outer surface 29 of the inner core 1 and an inner surface of the film 9 of the compressible core spacer 7, the inner surface designated by the reference numeral 33. Because the inner core 1 and compressible core spacer 7 are not attached to each other, the inner core 1 will rest on the folds 27 at a bottom portion of the inner core due to gravity so that the air gap 17 will not be uniform in size around the outside of the inner core. However, because of the folds 27 of the film 9 of the compressible core spacer 7, there is still an air gap surrounding the entirety of the outer surface 29 of the inner core 1 so as to form a reflective insulation system surrounding the entire inner core 1 when taking into account the low-e surface 5 on the outside of the inner core, see FIGS. 1a and 1b. Thus, the compressible core spacer 7 effectively holds the inner core 1 so that a generally concentric arrangement is created between the compressible core spacer 7 and the inner core 1.

The spacing function of the compressible core spacer 7 is better seen in FIG. 2b. That is, the air gap 17 is created between the outer surface 29 of inner core 1 and the inner surface 33 of the film 9 of the compressible core spacer 7. The second air gap 19 is created between the inner surface 35 of the bulk insulation 13 and the outer surface 37 of the film 9 of the compressible core spacer 7.

With the low-e surface on the outer surface 29 of the inner core 1 and creation of the air gap 17 as a result of the folded film 27 of the compressed core spacer 7, a reflective insulation system is created in the air gap 17 that improves the R value of the duct.

While the inner core 1 is represented to have a low-e surface on the outer surface 29, other surfaces in the duct assembly could also employ low-e surfaces. The arrows shown in FIG. 2b represent the surfaces of the inner core 1 and the compressible core spacer 7 that can be low-E surfaces and be reflective to assist in formation of one or more reflective insulation systems.

With regard to having other low-e surfaces and while not shown in the FIGS. 1a-g embodiment, another embodiment of the invention could include providing a low-e surface as part of the outer surface 37 of the compressible core spacer 7. Because of the folds 27 in the film 9 of the compressible core spacer 7, the second air gap 19 with a low-E surface as part of the outer surface 37 of the compressible core spacer 7 would function as a second reflective insulation system that would provide even more insulating value to the flexible duct 10.

Figure 3A:
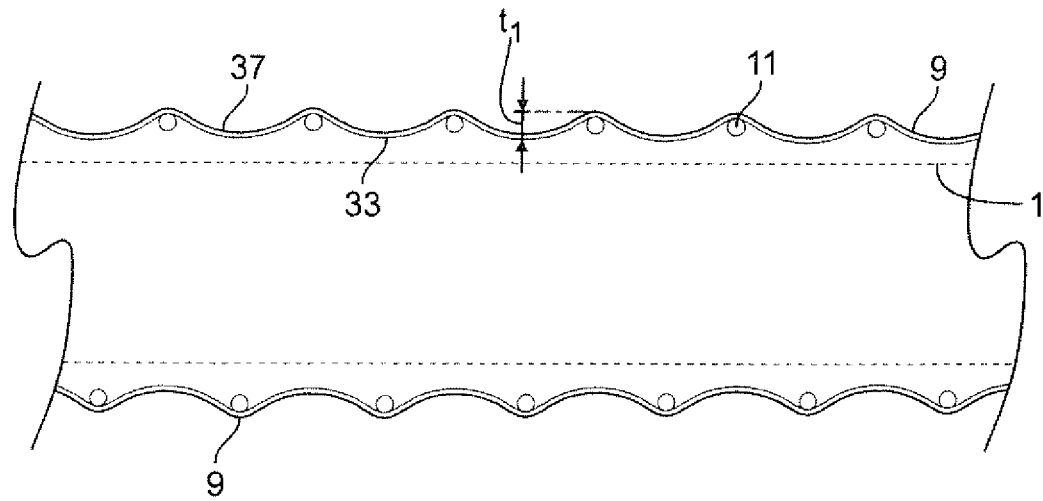
FIG. 3a is a schematic representation of the compressible core spacer in an uncompressed state.
Figure 3B:
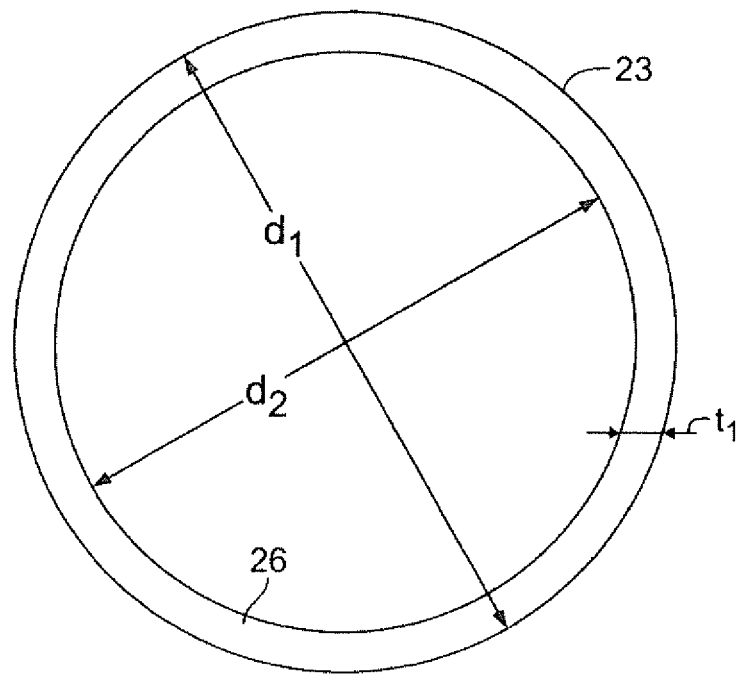

FIGS. 3a-3d shows another schematic representation of how the compressible core spacer dimensions can change with compression. FIGS. 3a and 3b represent the compressible core spacer 7 in its uncompressed state as shown in FIG. 1a. The compressible core spacer has an overall effective wall thickness represented by t1, which is a measure from the outer surface 37 where the helical supports 11 are located, which corresponds to line 23 in FIG. 2a, to the inner surface 33 created by the film 9 between adjacent portions of the helical support 11 extending just slightly inward. This slight inward extension is shown in FIG. 1a and creates a slightly larger effective wall thickness as seen in FIG. 3b than the thickness of the film and helical supports themselves.

Figure 3C:
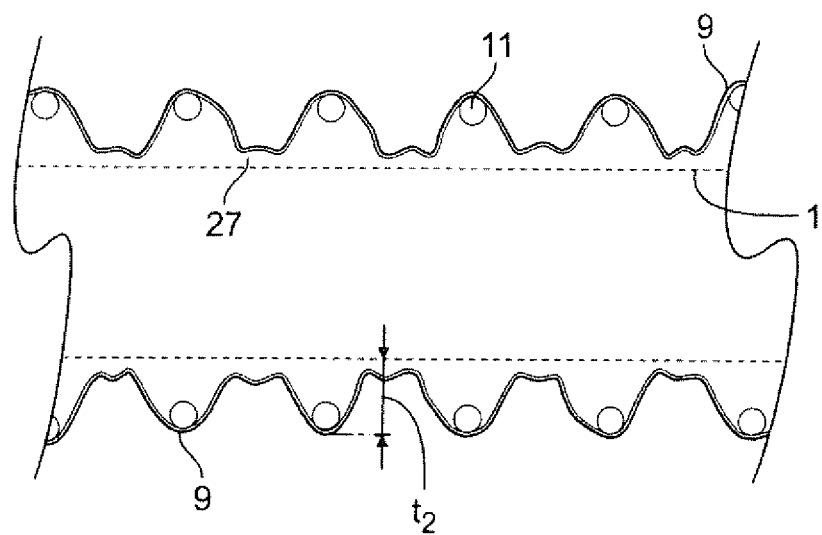
FIG. 3c is a schematic representation of the compressible core spacer in a compressed state.
Figure 3D:
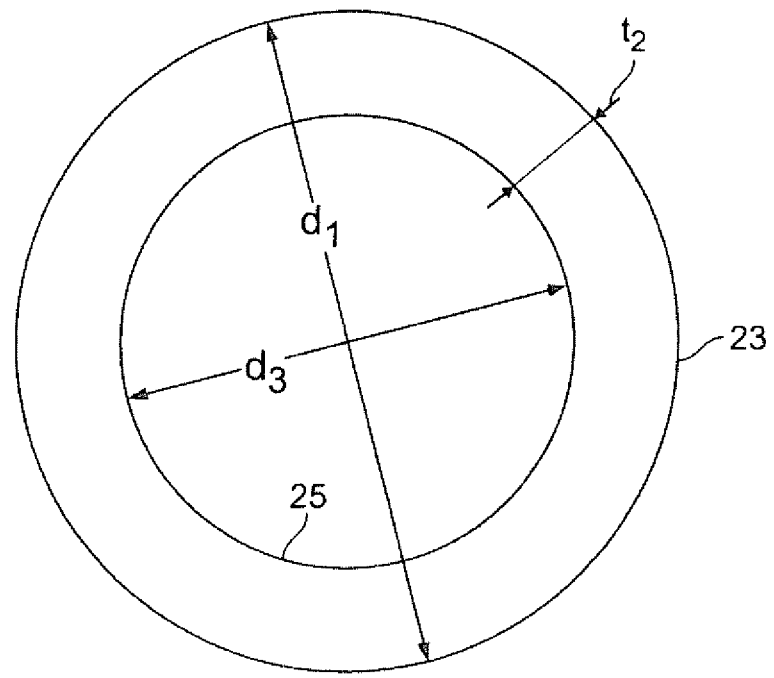
FIG. 3d is a schematic representation of an effective wall thickness of the compressible core spacer of FIG. 3c.

Referring to FIGS. 3c and 3d, when the compressible core spacer 7 is compressed in length such that the film 9 between adjacent portions of the helical support 11 is more folded, the inner diameter d3 is decreased and is less than d2 for the uncompressed state in FIG. 3a and the effective wall thickness t2 is greater than t1. The reduced inner diameter shown in FIG. 3d corresponds to the line 25 in FIG. 2a.

The change in the spacing function of the compressible core spacer 7 can be accomplished by using different pitches of the helical support 11. More particularly, if the pitch of the helical support 11 is increased, more film 9 would exist between adjacent portions of the helical support 11 and when the compressible core spacer 7 is compressed in the same manner, the effective wall thickness of the compressible core spacer 7 would increase. This increase in effective wall thickness means that the air gap 17 and the air gap 19 would be greater and there would be more distance between the surfaces of the compressible core spacer 7 and its adjacent components, e.g., the bulk insulation 13 and inner core 1, see FIGS. 1e and 2a.

Figure 4:
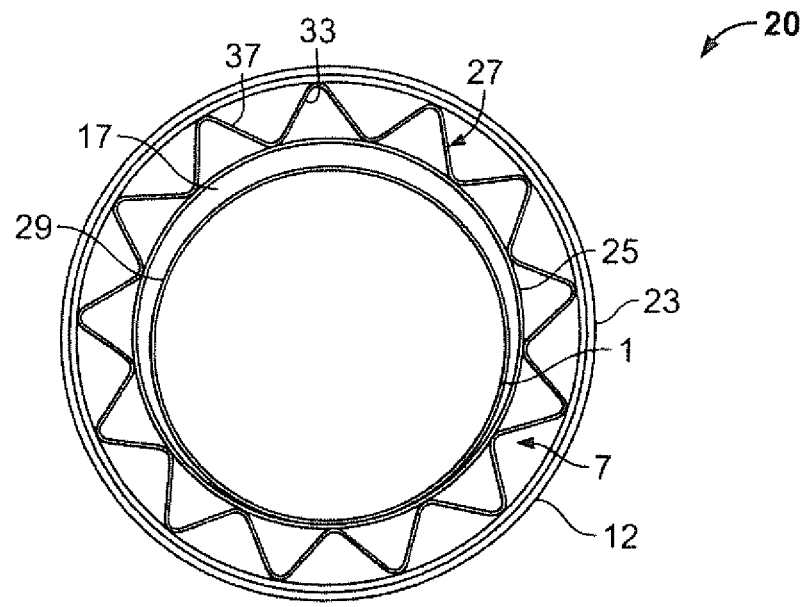
FIG. 4 is an end view schematic representation of an assembled insulated flexible duct of the invention using the inner core, the compressible spacer, and the vapor barrier.

FIG. 4 shows another embodiment of the invention as insulated flexible duct 20 wherein the flexible duct is made without the bulk insulation 13. That is, the compressible core spacer 7 interfaces with the vapor barrier 12 so that the air gap 19 created by the compressible core spacer 7 and its outer surface 33 when compressed can function as a reflective insulation system with the vapor barrier 12 instead of the bulk insulation 13. As an example of two reflective insulation systems, the inner core 1 could have its outer surface include a low-E surface and the outer surface 37 of the compressible core spacer 7 could employ a low-E surface. Alternatively, the compressible core spacer 7 could employ low-E surfaces on its inner and outer sides to create the two reflective insulation systems. If only one reflective insulation system would be used, the low-E surface could be on either the inner core alone, the outer surface alone of the compressible spacer, or the inner surface alone of the compressible spacer. If so desired, the outer surface of the inner core and the inner surface of the compressible core spacer could have low-E surfaces for the one reflective insulation system.

Figure 5:
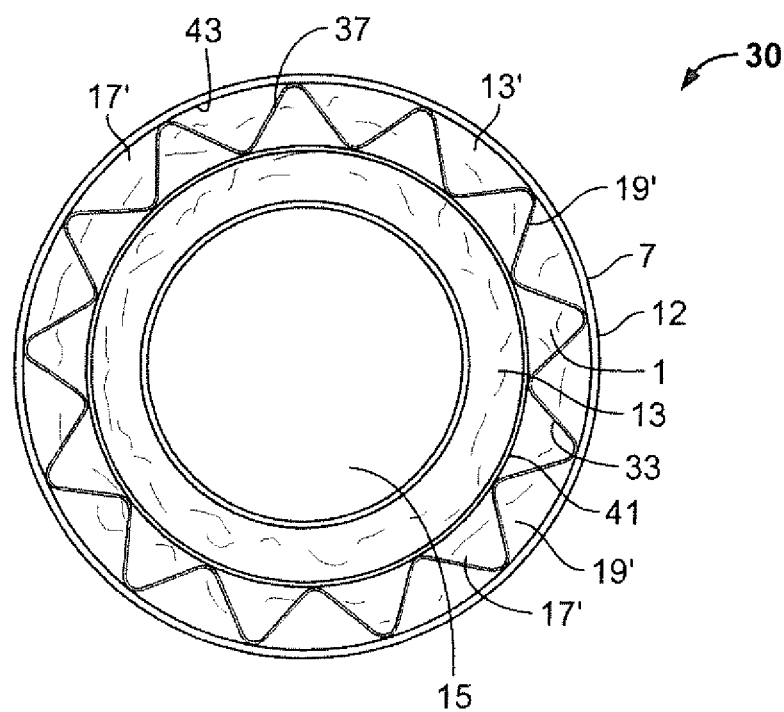

FIG. 5 shows yet another embodiment of the invention as flexible duct 30 wherein the bulk insulation 13 surrounds the inner core 1 and the compressible core spacer 7 surrounds the bulk insulation 13. In this embodiment, one air gap 17' is formed between the outer surface 41 of the bulk insulation 13 and inner surface 33 of the compressible core spacer 7 and another air gap 19' is formed between the outer surface 37 of the compressible core spacer 7 and inner surface 43 of the vapor barrier 12.

Figure 6:
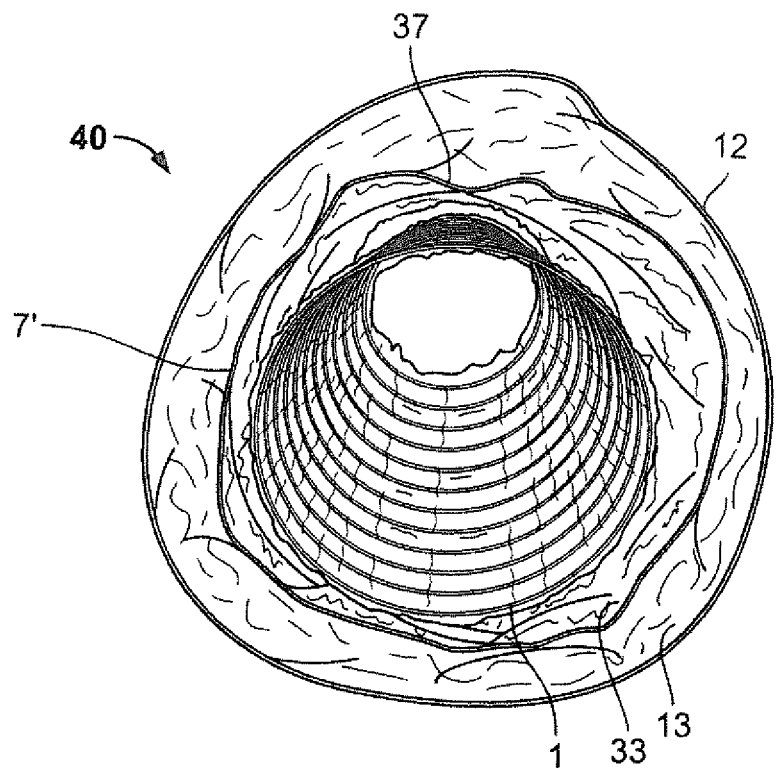
FIG. 6 is an end view of another embodiment of the flexible duct of the invention with the compressible core spacer having low-E surfaces on both sides thereof.

FIG. 6 shows another embodiment of the invention designated by the reference numeral 40. In this embodiment, the compressible core spacer 7' includes a low-E surface as part of its inner surface 33 and its outer surface 37 and the inner core 1 only uses a polymer film like the compressible core spacer of FIGS. 1a-1g. Thus, a reflective insulation system is created for the air gap 17 and the air gap 19 using the low-E surfaces on the inside and outside of the compressible core spacer 7'.

Figure 7:
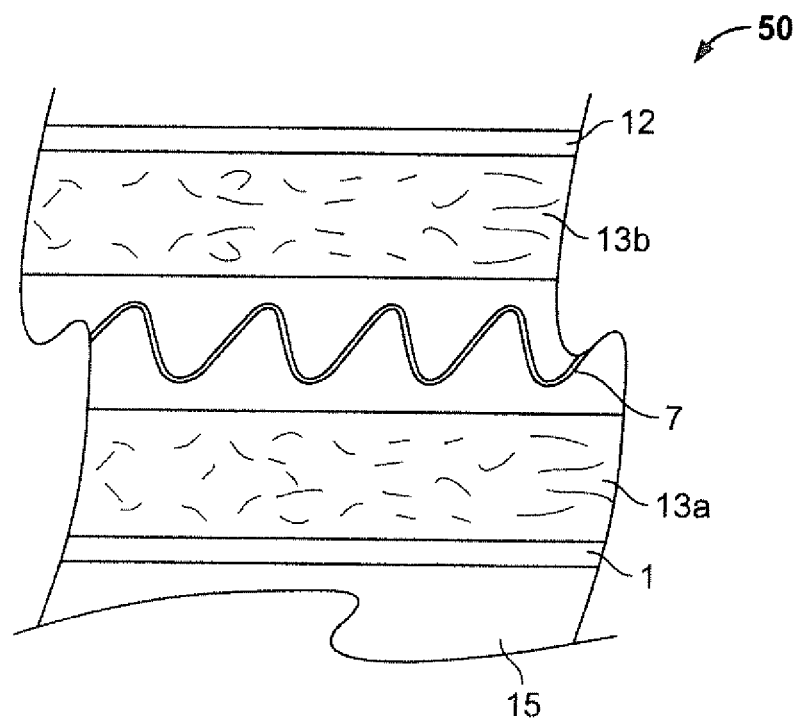
FIG. 7 is a schematic cross sectional view of the components of another embodiment of the insulated flexible duct of the invention.

FIG. 7 shows another embodiment of the invention as a schematic cross section of the layers making up a duct 50. In this embodiment, two bulk insulation layers 13 are used in the insulated flexible duct of the invention. A first layer of bulk insulation 13a surrounds the inner core 1 as in the FIG. 5 embodiment. The compressible core spacer 7 with low-E inner and outer surfaces is positioned between the first bulk insulation layer 13a and a second bulk insulation layer 13b. With this arrangement, an air gap and accompanying reflective insulation system is created on both the inner and outer sides of the compressible core spacer 7.

Referring back to FIG. 2a, the arrangement of the inner core 1 and compressible core spacer 7 is generally concentric as the space 17a is greater than the space 17b for the illustrated duct. However, it is also an embodiment of the invention, wherein the compressible core spacer could be sized in length and compressed such that the inner core 1 and compressible core spacer 7 would be a truer concentric arrangement such that there would be no gap like the gap 17a shown in FIG. 2a. In this embodiment, the compressible core spacer 7, with its multiple surfaces as a result of its longitudinal compression, contacts the inner core around its periphery so that it is held in place by the compressible spacer core, even though it is not fastened or attached to the compressible core spacer using some mechanical means.

Further, more than one compressible core spacer could be used as part of the flexible duct. For example, the duct could have an inner core surrounded by a first compressible spacer. The first compressible core spacer could be surrounded by bulk insulation. A second compressible core spacer could be used and this would be positioned between the outer surface of the bulk insulation and an inner surface of a vapor barrier. In this arrangement and with low-E surfaces on both sides of each compressible spacer, four reflective insulation systems would exist.

The compressible core spacer 7 should be made in a length sufficiently greater than the inner core so that there are sufficient folds 27 of the film between adjacent sections of the helical support 11 to function as a spacing material between the compressible core spacer 7 and an adjacent surface, whether that surface be the vapor barrier 12, bulk insulation 13, or the inner core 1. Generally, it is believed that the compressible core spacer should be at least 4% greater in length than the inner core 1 to create an adequate spacing so that the reflective insulation system can function properly. More preferred ratios of length for the compressible core spacer and inner core include about 1.05:1 and up to 3.1 to 1, with more preferable ratios including about 1.1 to 1, 1.5 to 1, 2.0 to 1.

A desired dimension for the air gaps created by the compressible core spacer and its compressing ranges between about 0.25 inches and up to 5.5 inches and more preferably up to 3.0 inches. This dimension will vary in a circumferential direction as the inner core 1 merely rests on the compressible core spacer 7, and the dimension of spacing at the bottom of the inner core 1 will be less than the spacing at the top of the inner core. Nevertheless, the compressible core spacer still provides an air gap dimension between the inner surface of the compressible core spacer 7 and outer surface of the core for the creation of a reflective insulation system and improved insulating performance of the duct. This air gap dimension roughly equates to the effective wall thickness of the compressible core spacer as detailed in connection with FIGS. 2a-3d. While the air gap will not be uniform along the length of the duct as the folding of the film 9 of the compressible core spacer will vary along its length, measuring the air gap in this way provides a means of measurement for the air gap so that it can be altered depending on the construction of the compressible core spacer.

The length of the vapor barrier 12 and bulk insulation 13 should generally also match the length of the inner core 1 when the flexible duct is assembled.

The dimensions for the various components of the flexible duct 10 and its air gaps 17 and 19 can vary depending on the particular application of the flexible duct. Typical overall diameters of the flexible duct ranges from 5.5 inches to 25.5 inches. As an example, a nominal 16.25 inch flexible duct would have an inner core of diameter of 12 inches, a compressible core spacer outer diameter of 14 a vapor barrier thickness is negligible in the duct diameter calculation, and 1.125 inches of wall thickness of bulk insulation.

The inventive flexible duct has some major advantages over prior art insulated flexible ducts. One advantage is the gain in insulating performance of the duct. In prior art flexible duct, the duct components are arranged and configured to provide about an R2 improvement in insulating performance. The flexible duct disclosed in the Campbell publication noted above can take a duct with R4.2 bulk insulation and convert it to a flexible duct having about R6 insulating performance. In this same publication, an R6 bulk insulation can be used to convert the flexible duct into one having about an R8 overall value.

With the inventive duct and use of the compressible core spacer, an R4.2 bulk insulation can be used between the vapor barrier and the compressible core spacer. With this arrangement and the use of low-E surfaces on both sides of the compressible core spacer, two reflective insulation systems are created and the duct can have about an R8 value in insulating performance. The significant advantage in this arrangement is that only R4.2 insulation is required to provide an R8 flexible duct. Since the bulk insulation is large part of the overall cost of these kinds of flexible ducts, a significant cost savings is obtained over prior art flexible ducts. Of course, higher R values for the bulk insulation could be used, e.g. R6 or R8, and the flexible duct having these kinds of bulk insulation would have a significantly higher R value than just the bulk insulation alone.

Testing has shown for this embodiment that when a compressible core spacer having low-E surfaces on either side thereof is used and an effective wall spacing of about 1 inch, and a bulk insulation having an R4.2 value is used, the insulation value of the duct can be improved to approximately R8. Of course, the gap sizes in this example are exemplary and smaller or larger gap sizes could be used as demonstrated by the range given above.

An insulation improvement can be realized with just the combination of the inner core, compressible core spacer and vapor barrier when two reflective insulation systems are employed. In this mode, with an inner core, compressible core spacer with two low-E surfaces and a vapor barrier, the insulation value of this duct is about R4. This is a significant insulation value considering that the duct has no bulk insulation.

Another significant advantage of the invention is ease of manufacturing of the flexible ducts. In other prior art flexible ducts, i.e., one embodiment disclosed in the Campbell publication, a bare helical member is used as a spacer to create an air gap between the inner core and bulk insulation. This bare helical member makes assembly of the various duct components difficult. Also, when flexible ducts are being pieced together in the field, the bare helical member can migrate outside of the end of the duct and this then creates difficulties when connecting ends of two duct segments together.

In addition, when the flexible duct is assembled, it is much easier using the generally cylindrically shaped compressible core spacer with the bulk insulation and inner core as the compressible core spacer easily slides with respect to adjacent components like bulk insulation, a vapor barrier, and an inner core. This is not the case when having to assemble bulk insulation, a bare helical member, a vapor barrier, and an inner core to make a defined length of flexible duct. Thus, the rate at which the flexible duct can be assembled using a compressible core spacer instead of a bare helical member is significantly higher and an economic savings is realized in this regard.

Another advantage occurs in the packaging of the flexible duct prior to it being used in a conditioned air handling system. Typically, the flexible ducts are made in predetermined lengths and these lengths are either cut to size in the field or duct segments are connected together to make a run longer than just one duct segment. Flexible ducts are normally packaged in a compressed state in boxes or plastic bags. The inventive duct creates a significantly reduced package length while containing the same duct length. This is accomplished by the following:

1) the presence of an air gap between the inner core and bulk insulation better allowing the evacuation of air from the insulation during the compression of the product;

2) the air gap also allowing space for the inner core to freely move during the compression process (this gap allows for both the layer of insulation and the inner core to better fold and flatten inside the duct construction); and 3) the presence of the helical support as part of the compressible core spacer holds the insulation against the vapor barrier thereby providing increased crush resistance during the packaging process.

What the embodiments of the invention discussed above show is that the insulated flexible duct can have one, two, or more than two reflective insulation systems using the compressible core spacer. In one mode, an insulated flexible duct could be made assembled with just one reflective insulation system, with or without bulk insulation. For example, only the outer surface of the inner core or only the inner surface of the compressible core spacer could include the low-E surface so that only one reflective insulation system would exist between the inner core and compressible spacer.

Alternatively, only the outer surface of the compressible core spacer or the inner surface of the vapor barrier could include the low-E surface so that only one reflective insulation system would exist between the compressible core spacer and the vapor bather. This same use of only one low-E surface could be employed if bulk insulation were used as part of the flexible duct and the low-E surface could be one of the inner or outer side of the compressible core spacer depending on the location of bulk insulation.

In yet another embodiment, both facing surfaces creating a reflective insulation system could have low-E surfaces. For example, for the air gap between the outer surface of the inner core and inner surface of the compressible spacer, a low-E surface could be on both of the outer surface of the inner core and the inner surface of the compressible spacer.

The insulated flexible duct of the invention can be used in any application where conditioned air needs to be handled or conveyed to a desired location, e.g., residential and commercial HVAC system. When using the inventive flexible duct, a number of segments of duct can be connected together for the supply of conditioned air to a desired space or spaces in a given structure since the ducts are manufactured in predetermined lengths and a particular duct run may require joining of several duct segments together.

When the ducts are assembled for packaging and shipment, including compressing the compressible core spacer, a step should be taken as the compressible core spacer and inner core and vapor bather are not attached to each other. In one mode, the ends of the inner core and compressible core spacer can be clamped/taped together keeping end points fixed when used in combination with bulk insulation and the vapor barrier.

In another mode, if the compressible core spacer is utilized without bulk insulation, then the inner core, compressible core spacer, and outer jacket/barrier could be all clamped/taped together keeping all end points fixed. Alternatively, the vapor barrier could remain unattached and just the compressible spacer core and inner core be fixed together. These modes to keep the different lengths of compressible core spacer and inner core generally aligned at the ends of a given duct segment can be virtually any type of fastening means or devices, mechanical, adhesive, or combinations thereof.

As such, an invention has been disclosed in terms of preferred embodiments thereof which fulfills each and every one of the objects of the present invention as set forth above and provides a new and improved insulated flexible duct and method of use.

Of course, various changes, modifications and alterations from the teachings of the present invention may be contemplated by those skilled in the art without departing from the intended spirit and scope thereof. It is intended that the present invention only be limited by the terms of the appended claims.

We claim:

1. A reflective insulating system-containing flexible duct comprising:
   an inner core having a defined length;
   a vapor barrier surrounding the cylindrical inner core;
   a compressible core spacer positioned between the inner core and vapor barrier, the compressible core spacer comprising a film material and helical support integrated with the film material, a length of the compressible core spacer longer than the defined length of the inner core, the compressible core spacer compressible in length when positioned between the inner core and vapor barrier, compression of the compressible core spacer folding film material between adjacent sections of the helical support, the film material when folded acting as a spacer to create a first air gap between an outer surface of the inner core and an inner surface of the compressible core spacer and a second air gap between the outer surface of the compressible core spacer and an inner surface of the vapor barrier; and at least one reflective insulation system comprising a low-E surface on one or more of the outer surface of the inner core, the inner surface of the compressible spacer, the outer surface of the compressible spacer, and an inner surface of the vapor barrier, the low-E surface in combination with one of the first or second air gaps forming the at least one reflective insulation system and increasing an R value of the flexible duct.

2. The flexible duct of claim 1, further comprising at least one bulk insulation layer, the at least one bulk insulation layer positioned between at least one of the inner core and the compressible core spacer and the compressible core spacer and the vapor barrier.

3. The flexible duct of claim 2, wherein one bulk insulation layer is positioned between the compressible core spacer and the inner core and another bulk insulation layer is positioned between the compressible core and the vapor barrier.

4. The flexible duct of claim 2, wherein the bulk insulation has one of an R4.2 value, an R6 value, and an R8 value.

5. The flexible duct of claim 1, comprising at least two reflective insulation systems, wherein at least a pair of low-E surfaces are used.

6. The flexible duct of claim 5, wherein one of the low-E surfaces is located on an inner surface of the compressible core spacer and another one of the low-E surfaces is located on an outer surface of the compressible spacer.

7. The flexible duct of claim 5, wherein one of the low-E surfaces is located on the outer surface of the inner core and another one of the low-E surfaces is located on the outer surface of the compressible spacer.

8. The flexible duct of claim 5, wherein each of the outer surface of the inner core and the inner and outer surfaces of the compressible core space have the low-E surface.

9. The flexible duct of claim 5, wherein each of the outer surface of the inner core and the inner surface of the vapor barrier have the low-E surface.

10. The flexible duct of claim 1, wherein a ratio of the length of the compressible core spacer and the length of the inner core ranges between about 1.04:1 to up to about 3.0:1.

11. A method of supplying conditioned air to a space using an insulated duct, comprising:
   a) providing the duct of claim 1; and
   b) supplying conditioned air through the duct and to a space serviced by the duct.

* * * * *